United States Patent [19]

Kopp

[11] 4,128,371
[45] Dec. 5, 1978

[54] DEVICE FOR PRESSING OUT MATERIAL IN THE FORM OF A STRAND

[75] Inventor: Eugen Kopp, Stuttgart, Fed. Rep. of Germany

[73] Assignee: Werner & Pfleiderer, Stuttgart, Fed. Rep. of Germany

[21] Appl. No.: 804,870

[22] Filed: Jun. 9, 1977

[30] Foreign Application Priority Data

Feb. 5, 1977 [DE] Fed. Rep. of Germany ....... 2704832

[51] Int. Cl.² ................................................. B29F 3/00
[52] U.S. Cl. .................................. 425/192 R; 72/272; 425/376 R; 425/461
[58] Field of Search ............. 72/272; 425/190, 192 R, 425/376 R, 461; 264/176 R

[56] References Cited

U.S. PATENT DOCUMENTS

| 2,301,338 | 11/1942 | Smith | 425/192 X |
| 3,369,384 | 2/1968 | Beneke et al. | 72/272 |
| 4,040,284 | 8/1977 | Fuchs, Jr. | 425/192 R X |

*Primary Examiner*—Francis S. Husar
*Assistant Examiner*—Mark Rosenbaum
*Attorney, Agent, or Firm*—Hane, Roberts, Spiecens & Cohen

[57] ABSTRACT

A device for pressing out pliable and/or pulverized material in the form of a strand comprising a matrix supported by a matrix pan which can be lifted relative to the container for the material to be pressed out whereby the matrix can be easily detached for cleaning and other services. The length of the matrix relative to the pressure table is such that the emerging strand can be checked directly at the discharge end of the matrix and be easily and accurately cut into sections by a cutting device.

8 Claims, 4 Drawing Figures

FIG. 3
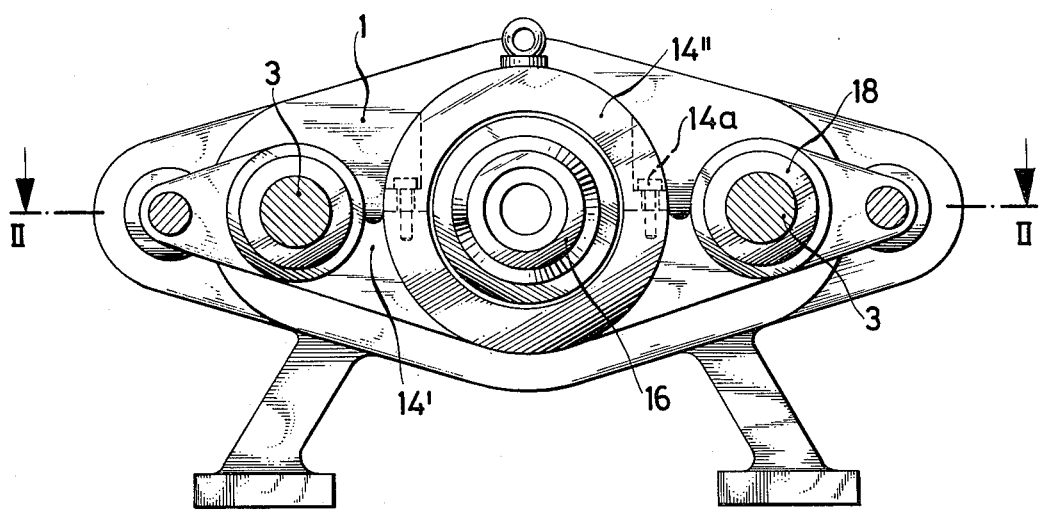
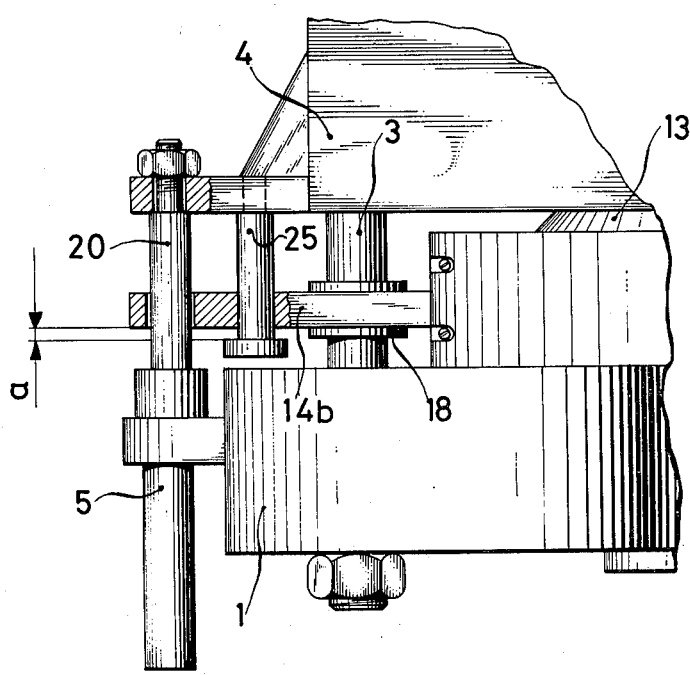
FIG. 4

DEVICE FOR PRESSING OUT MATERIAL IN THE FORM OF A STRAND

FIELD OF THE INVENTION

The present invention relates to a pressing device, and more particularly to a device for pressing out pulverized and/or plasticized material such as explosive material in the form of a continuous strand.

BACKGROUND

There are known pressing devices of the general type above-referred to in which a container for the material to be pressed out is axially movable between two posts by a piston-cylinder servo system. The material in the container is subjected to pressure by a pressure piston coacting with a matrix which is axially displaceable relative to the container and an opening in a pressure table.

A piston press device of this type is known, for instance, from German Pat. No. 1,941,829. The structure of such press is essentially dependent on high safety measures requirements. The required safety measures include, for instance, a surface area within the pressure space and associated with the matrix coacting with the container for the material. Such arrangement does and must make possible an immediate lifting of the container if there is an excessive pressure build-up. The pressure table receiving the matrix makes certain that the matrix is carried by the table and is not rapidly expelled in case of sudden pressure build-up. The material pressed into and through the matrix for processing therein moves not only within the matrix but also within the receiving opening in the pressure table and thus can be checked or further processed only after it has emerged from the hole in the table. The further processing of the strand pressed out at the discharge end of the matrix by the piston press is mainly carried out after the strand has been cut into sections by the cutting device. As the cutting device during the cutting operation is carried by the strand, it is desirable that the cutting of the strand starts at the discharge end of the matrix so that a lateral displacement of the strand is avoided. This makes it possible to operate the cutting device as a new strand emerges from the matrix. However, a matrix protruding from the opening in the pressure table makes removal of the matrix difficult. Such detachment of the matrix is necessary at rather short intervals for cleaning of the pressing device.

Accordingly, it has heretofore been the practice to place a matrix secured to a matrix pan so that most of the length of the matrix protrudes from the pressure table. Such arrangement has not only the disadvantage that the overall length of the pressure device is considerably increased, but also that the checking and handling of the strand extruded from the matrix are difficult.

THE INVENTION

It is a broad object of the invention to provide a novel and improved pressing device of the general type above-referred to in which the matrix is secured against being expelled in case of abrupt increase of pressure, yet can be easily assembled and disassembled for cleaning and/or otherwise servicing.

Another broad object of the invention is to provide a novel and improved pressing device of the general type above referred to which includes cutting means to effect sectioning of the strand continuously and directly at the mouthpiece of the matrix when and while pressing out the material is in operation.

SUMMARY OF THE INVENTION

The above objects, features and advantages as well as other objects, features and advantages which will be pointed out hereinafter and are set forth in the appended claims, are obtained by providing a matrix which has a length at least equal to the length of the passage opening in the pressure table and further providing a matrix pan which consists of two parts, preferably halves. One part of the pan is guided by two posts and can be axially displaced relative to the posts and the other part of the pan is releasably attachable to the first half. Such arrangement has the advantage that the matrix proper and, more particularly, the discharge end thereof are readily accessible.

The structure of the matrix according to the invention is compact and can be disassembled in several parts. To effect cleaning only one part of the matrix need be detached. The invention also provides that the length of the matrix extends at least to the side of the pressure table at which the strand leaves the table. This has the advantage that the strand can be checked directly at the discharge end of the matrix. Such close observation of the strand is very advantageous for quality check-out and the setting of the device. Moreover, further processing of the strand material can start directly at the discharge end of the matrix.

The material fed into the container must be subjected to evacuation as the first operating step. The device according to the invention greatly facilitates this step in that a sealing member can be manually attached to the discharge opening of the matrix which, when the pressing step is started, is automatically ejected and can be easily and safely recovered.

According to a further advantageous feature of the invention, the displacement of the matrix pan and of the container for the material are effected simultaneously by means of a piston-cylinder servo system supported by the pressure table. By retracting the container simultaneously with the axial displacement of the matrix pan, the heretofore required drive means are eliminated, thereby not only simplifying the device but also reducing the cycling time.

Another advantageous feature of the invention is that the matrix pan and the container for the material are movably coupled by a carrier which retracts the container by a partial lift(a) from the matrix pan whereby by means of the piston-cylinder servo system the separation of the matrix from the pan is made possible after the container is lifted. The complete and hereinafter automatic separation of the matrix from the container further facilitates the detachment of the removable matrix part without additional operational steps.

According to a still further feature of the invention removal of the matrix from the container and sliding of the matrix out of the pressure table can be carried out in a single operational step. To effect such simplified separation displacement of the container is effected by operatively coupling the same with the piston rod of the piston-cylinder servo system. For this purpose the total lift length of the servo system is equal to the sum of the partial lift($a$) and the length($b$) of the matrix portion extending into the passage opening in the pressure table.

The invention also provides a separation of the matrix from the container for the material in one operation by inserting the piston rod of the piston-cylinder servo system into a bore provided in the matrix pan for such insertion and is stepped within the lift range of the matrix to effect lifting of the pan.

BRIEF DESCRIPTION OF THE DRAWING

In the accompanying drawing several preferred embodiments of the invention are shown by way of illustration and not by way of limitation.

IN THE DRAWING

Figure 1:
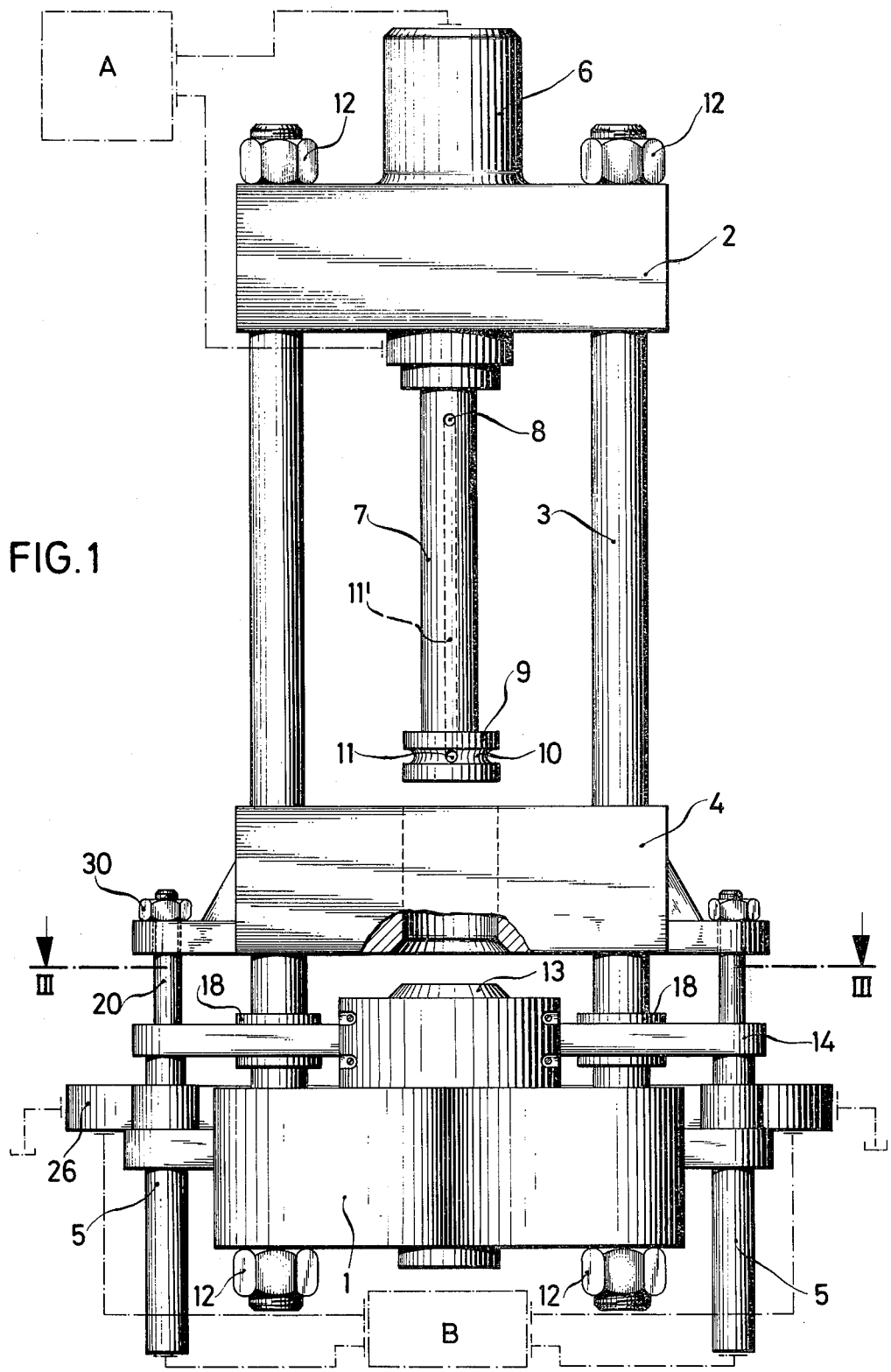
Figure 2:
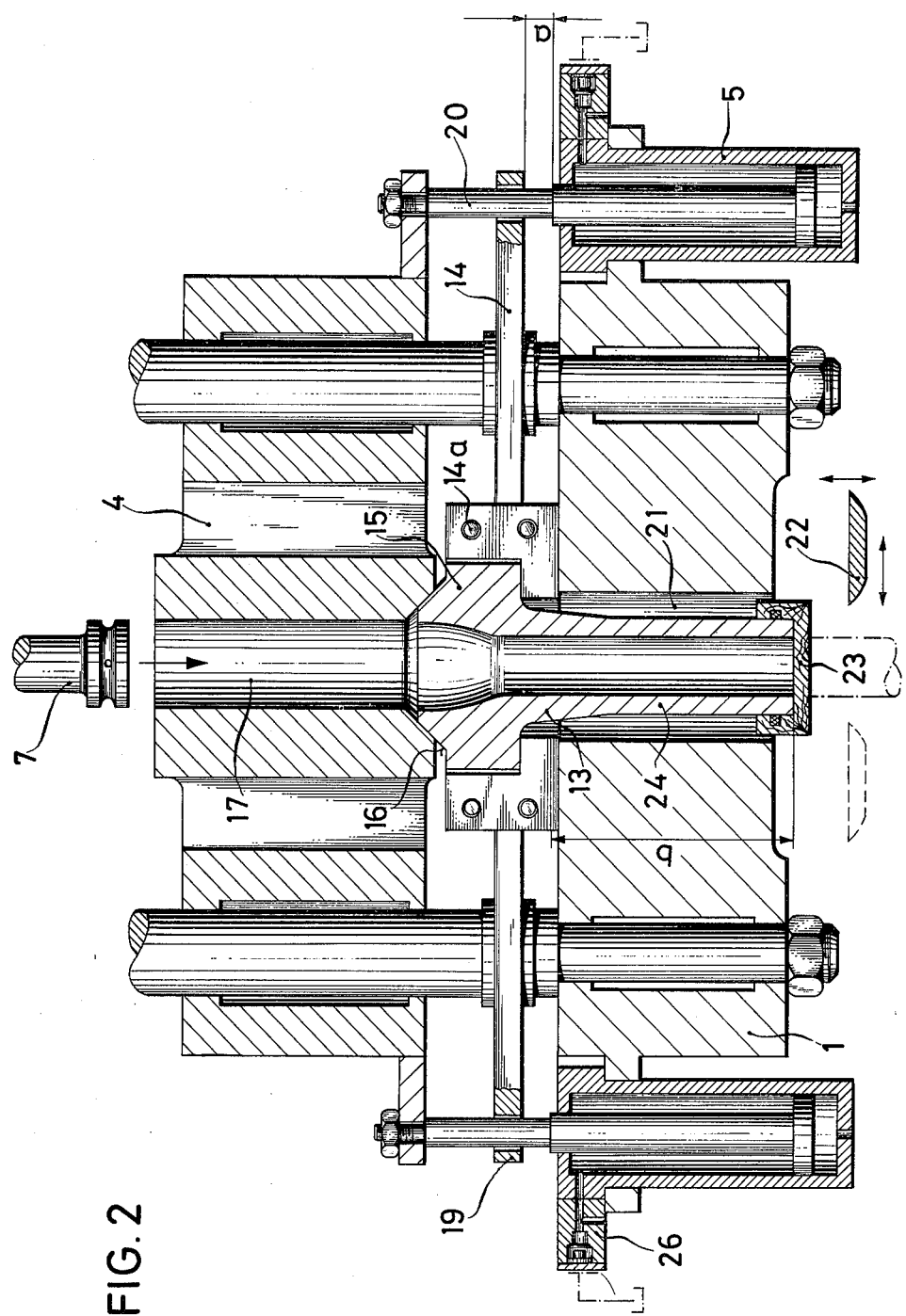

FIG. 1 is a diagrammatic elevational view of a device for pressing out material in the form of a strand;

FIG. 2 is a fragmentary sectional view of the device taken along line II—II in FIG. 3;

FIG. 3 is a sectional view of the device taken along line III—III in FIG. 1; and FIG. 4 is a fragmentary, partially sectional, view of a modification of the device shown in FIGS. 1 to 3.

DETAILED DESCRIPTION OF THE DRAWING

Referring more in detail to the drawing figures, the embodiment of the invention shown in FIGS. 1 to 3 comprises a pressure table 1 and a crosshead or yoke 2 joining two guide posts 3 which are secured to the yoke by nuts 12. A container 4 for the material to be pressed out in the form of a strand is disposed between table 1 and yoke 2. This container is axially displaceable along posts 3 by means of a hydraulic or otherwise operated cylinder-piston servo system 5. The yoke 2 further mounts a pressure cylinder 6 and a coacting piston rod 7 which is provided with a connection 8 for a vacuum system. The evacuation is further effected by a piston 9 at the end of rod 7. This piston has a groove 10 which is connected by bores 11 and 11' to vacuum connection 8.

According to FIG. 2, pressure table 1 is provided with a passage 21 which is axially aligned with the container 4 for the material to be processed and serves to insert a matrix 13. A pan 14 for the matrix is provided between table 1 and container 4. This pan has an opening 14a for receiving the upper cylindrical portion 15 of the matrix 13. The matrix protrudes with a conical portion 16 above the pan so that by providing a conical recess in a hole 17 of the container 4, effective sealing is obtained during the evacuating and pressing operations. Moreover, the recess in the hole 17 constitutes an area which assures a lifting of the container 4 if a sudden excessive increase of pressure occurs.

As shown in FIG. 3, the matrix pan 14 is divided so that the half 14' can be displaced by means of slidable rings 18 which are guided on posts 3. The other half 14" of the pan can be detached by loosening of screws 14a.

The pan 14 has at its outer end holes 19 into which are inserted piston rods 20 of the piston-cylinder servo system 5. These piston rods are secured by nuts 30 to container 4 to effect axial displacement thereof. The rods have stepped diameters whereby the rods after being lifted a distance a will lift the pan 14 until upon completion of this lift distance of the rods the pan is raised above the pressure table 1.

Instead of providing stepped piston rods 20 the matrix pan can also be lifted by fixedly securing the container 4 to a carrier 25 as shown in FIG. 4.

The total lift distance of the piston rods 20 is determined by the length of the portion of the matrix moving into table 1 and the lift distance a of the container 4. The length of the matrix 13 extending into the pressure table corresponds at least to the thickness of the table as the matrix must reach at least the bottom side of the table. As a result of such correlation of distance, the discharge end 24 of the matrix can be closed off in a simple manner from the outside of the table by a sealing member 23 such as a wood or aluminum closure for the purpose of evacuation of the material. If and when the material is removed from the container in the form of a strand, such strand will automatically push out the sealing member.

A cutting device 22 of conventional design continuously coacting with the emerging strand makes it conveniently possible to cut the strand in pieces of selected length. The cutting of the strand can be effected immediately when the strand emerges from the discharge end 24 of the matrix so that piling up or outward bending of the strand is effectively avoided. Moreover, the strand can be conveniently observed.

Operation of the pressing device. Upon filling of the container 4 with material to be pressed and sealing of the discharge end 24 of the matrix with the sealing member 23, the press piston 7 is lowered into the container 4 so that the material can be evacuated via bores 11 and 11' and the vacuum connection 8. When the desired vacuum has been reached, the pressure piston 8 advances to press the material out of the container into and through the matrix so that the material is discharged from the matrix in the form of a profiled strand.

A side of the emerging strand may be continuously or interruptedly checked by a probe or sensor of conventional design (not shown) which sends pulses controlling the lengths of strand sections cut by the cutting device as the strand leaves the device.

Upon emptying of the material in the container 4, the press piston 7 is returned by a conventional device A into its starting position.

Disassembly of the matrix 13 for purpose of cleaning upon emptying of the container is effected by activating the piston-cylinder servo system 5 via a hydraulic unit B of conventional design. During the cleaning operation, the piston rods 20 lift the container 4 from the matrix. As the rods 20 are further lifted, the matrix pan is also lifted via the steps of the rods and thus also the matrix until it is lifted above the pressure table 1. The detachable half 14" of the matrix pan is exposed for detachment and the matrix can now be easily removed. Reassembly of the matrix halves is effected by the aforedescribed steps in reversed order.

The above-described insertion of the matrix into the pressure table, the mounting of the matrix on a divided matrix pan, and the axial displacement of the matrix by the piston-cylinder servo system have the advantage of convenient assembly and disassembly of the matrix. Moreover, it is assured that the produced strand can be easily and accurately controlled when emerging from the discharge end 24 of the matrix.

The sealing and the arrangement of the space for pressing as provided in the bore 17 are assured in a simple and effective manner by close engagement of the matrix with the container 4 due to a conical ring surface or a matching recess in the container. If there is a likelihood that the material to be pressed disintegrates, a press reduction in the recess area may be effected.

To protect the piston press device in case of overload when the pressure in the piston-cylinder servo systems increases to excessive levels such pressures can be reduced by discharging the hydraulic medium.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A pressing device for pressing out pliable and pulverized material in the form of a strand, said device comprising:

a container for the material to be pressed out; parallel spaced apart guide posts, said container being supported by said posts for axial movement relative thereto; a pressure table having a passage extending through the thickness of said table, an elongate matrix having a discharge end, said matrix being axially movable and extending through said passage in said container into confronting relation with said container for pressing material from the container out of the matrix; a piston coacting with the container and matrix for pressing material through the matrix; a matrix pan including two parts, means detachably connecting said two parts of the matrix pan, said pan removably supporting said matrix, means supporting said pan for axial displacement relative to the pressure table, said guide posts engaging and guiding one part of the matrix pan when said one part is axially displaced; and drive means operatively associated with the container for axially displacing said container away from said matrix and means coupling said drive means and said pan for displacing said pan and the matrix therewith together with said container after the container has been displaced away from said matrix by a predetermined lift distance.

2. The device according to claim 1 wherein said drive means comprises a piston-cylinder servo system disposed in the pressure table.

3. The device according to claim 2 wherein said means coupling the drive means and said pan comprises support means coupling said matrix pan and said container so as to allow separation of the container from the pan by said lift distance, 4. The device according to claim 2 wherein said drive means further comprises a piston rod operatively coupled with said container for lifting the same through a total distance composed of said lift distance plus the length by which the matrix extends into the passage in the pressure table.

5. The device according to claim 4 wherein said matrix pan has a guide hole, said piston rod extending through said hole, said means coupling the drive means and pan being constructed wherein said piston rod has a stepped diameter with a shoulder in such position that the matrix pan is lifted only after the container has been lifted through said pre-determined lift distance.

6. The device according to claim 1 wherein said container is constituted as a single member disposed above said matrix.

7. The device according to claim 1 wherein said means coupling said drive means and said pan comprises means for connecting said one part of the pan with the drive means after said container has been displaced by said pre-determined lift distance.

8. The device according to claim 1 wherein said matrix has a conical protruding surface facing said container, said container having a conical recess for sealably receiving said conical protruding surface.

* * * * *